3,201,468
PREPARATION OF α-ISONITROSOKETONES BY NITROSATION OF KETONES
Luigi Marangoni, Limbiate, and Adriano Nenz, Milan, Italy, assignors, by mesne assignments, to Edison, Milan, Italy, a corporation of Italy
No Drawing. Filed Dec. 10, 1962, Ser. No. 243,580
Claims priority, application Italy, Dec. 14, 1961, 22,350/61
5 Claims. (Cl. 260—566)

This invention relates to the nitrosation of organic compounds, and more particularly to the nitrosation of keto-compounds having a methyl or methylene group adjacent to the carbonyl group.

An object of this invention is to provide a simple and cheap method for preparing α-isonitrosoketones, otherwise referred to as α-hydroxy imino ketones. A further object of this invention is to obtain said α-isonitrosoketones using nitrosyl chloride, as the nitrosating agent, in yields substantially higher than heretofore.

Said α-isonitrosoketones are suitable organic intermediates in the synthesis of a number of outstanding compounds, such as, for instance, α-diamines, α-amino ketones, α-amino alcohols, α-dioximes, amino acids, ketonitriles, hetero-cyclic compounds, etc., α-isonitrosoketones may be mainly prepared by reacting an acylacetic ester or a ketone having a methyl or methylene group adjacent to the carbonyl group, with an inorganic nitrite and an inorganic acid, an alkyl nitrite and analkoxide, an alkyl nitrite and HCl, n-butyl nitrite and 85% $H_2SO_4$, or nitrous gas and traces of HCl.

In practice, almost all of these methods, as above described, are not easily applicable or give poor yields of the product, or, if the yields are high, the agents employed are expensive (f.i. alkyl nitrites).

It has now been found that the use of NOCl, as the nitrosating agent, owing to the availability and accessibility of nitrosyl chloride, presents the following advantages: the nitrosation reaction may be carried out in such a simple and easy way that the reaction product may be selectively obtained and easily recovered from the by-products; the undesirable by-products may be obtained in a very small amount and the non-converted ketone may be easily recovered. These and other advantages, which will appear as the specification proceeds, may be obtained, when the method of this invention is used.

At room temperature nitrosyl chloride is a yellow-red gas, which on cooling is converted into a brown-red liquid boiling at $-5.8°$ C. and solidifying at $-61.5°$ C. into cherry-red crystals. It's several preparation methods, some of which are also industrially applied, allow the nitrosyl chloride to be easily available and, in particular cases, to be cheaply produced. This compound, which is the nitrous acid chloride, is decomposed by water, but the liquid form may be easily handled, provided that it is treated in closed containers or in ventilated rooms. The liquid may be also stored and shipped in containers made of suitable materials. Owing to its strong nitrosating properties, it is a suitable agent for the nitrosation and chloronitrosation of several organic materials.

It is well known that nitrosyl chloride may react with ketones having at least one methylene group adjacent to the carbonyl group to give the corresponding α-isonitrosoketones, according to the following reaction:

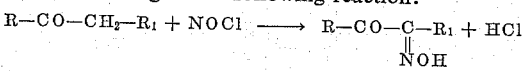

wherein R=an alkyl or aryl radical, and $R_1$=H or an alkyl or aryl radical (E. V. Lynn and F. A. Lee, J. Am. Ph. Ass. 16, 309; H. Rheinboldt and O. Schmitz-Dumont, B., 61B, 32–33; J. Am. Ph. Ass. 17, 134–135).

However, this reaction is not industrially applicable, because the above reaction is always followed by side-reactions, so that many undesirable by-products are formed, the yield decreases and the desired product purification is more difficult. Such side-reactions have been described, for instance, by the following authors: H. Reinboldt and O. Schmitz-Dumont, L., Ann. 444, 113–35; H. Rheinboldt, M. Dewald, F. Jansen and O. Schmitz-Dumont, Ann. 1451, 161–78; H. Rheinboldt and M. Dewald, Ann. 451, 273–81; 460, 305–14; M. Dewald, Graduation Thesis, Bonn Univ., 1926; F. Jansen, Graduation Thesis, Bonn Univ., 1926.

According to this invention, it has now been found, that the nitrosation reaction may give the desired product if to the ketone-nitrosyl chloride mixture such a material is added which reacts with hydrochloric acid as formed from the reaction, and does not allow the latter to react with both the obtained isonitrosoketone and the non-converted ketone.

Moreover, the said material, when added, allows the nitrosation reaction to be carried out at such a temperature that the primary reaction rate prevails over the rate of other side-reactions.

A further advantage of this invention is that the reaction occurs in the presence of an excess of ketone substantially lower than that in the absence of the neutralizing agent.

Therefore, the present invention substantially affects the technical and economical value of the nitrosation process.

According to this invention, suitable neutralizing agents comprise organic and inorganic bases and salts thereof with weak inorganic and organic acids. Besides, the neutralizing agent has to be chemically inert to both ketone and isonitroso ketone under the reaction conditions.

According to this invention, the preferred neutralizing agent is calcium carbonate. The use of this compound, owing to its cheapness, ease of use and poor solubility in the reaction medium, highly improves the nitrosation process from an economical and technical point of view.

On carrying out the reaction according to the method of this invention, nitrosyl chloride may be added to the ketone to be nitrosated either in the liquid or gaseous form. The higher the ketone/NOCl molar ratio is, the higher the product yield and purity become, a ratio ranging from 9 to 13:1 being the preferred one. The neutralizing agent may be added together with NOCl; alternatively, it may be suspended as a solid into the ketone at the beginning of the reaction. The neutralizing agent may be added in an equivalent amount or in a stoichiometric excess based on the nitrosyl chloride added to the reaction mixture.

Unlike the former processes, the temperatures, at which the nitrosation reaction may be carried out, can have a wide range. For instance, suitable temperatures range from $-15°$ C. to $+40°$ C., the preferred temperatures ranging from $+15°$ to $+30°$ C., as at these temperatures under the conditions according to the present invention, the reaction occurs at a high rate and gives a very small yield of undersirable products.

According to this invention, after the inorganic salts have been filtered, the resulting insonitrosoketone may be separated from the excess ketone by distilling the latter under reduced pressure from $0°$ to $50°$ C., preferably from $20°$ to $30°$ C.

The present invention allows the nitrosation reaction with NOCl to be carried out as a continuous industrial process, which has never been done heretofore.

Besides, the synthesis of α-isonitrosoketones through the new continuous industrial process has over the former processes the following advantages:

Only two reagents have to be proportioned, both of them being in the liquid form; the neutralizing agent may be added to the reaction vessel in a batch way, as the amount of said agent present in the reaction mixture may range widely; the excess reagents may be recovered in a continuous way using conventional methods (filtration and distillation); the suitable range of the temperatures is wide enough; owing to the reaction technics, only very small amounts of reagents and reaction products are lost; besides, the continuous recycle of excess reagents is possible.

The following examples illustrate the invention without limiting it.

*Example 1*

A suspension of 72 gr. of fine powdered $CaCO_3$ in 620 ml. of acetone was reacted with 72 gr. of liquid NOCl at a temperature ranging from 17° to 20° C. while stirring. The NOCl addition was completed over 4 hours. The residual insoluble solids were filtered by suction and washed twice with 70 gr. of ethyl ether. The two combined or separate acetone and ether solutions were then evaporated to dryness under reduced pressure at room temperature to give 93 gr. of crude isonitroso acetone, containing α-chloro isonitrosoacetone and phorone as the impurities.

As stated through titration with an aqueous alkali, the product purity was about 83%. The yield of the pure product based on the added nitrosyl chloride was about 80.7%, and the yield based on the used acetone was about 88.2%.

*Example 2*

A suspension of 52.9 gr. of $CaCO_3$ in 620 gr. of acetone was reacted with 52.9 gr. of NOCl following Example 1 to give 70.5 gr. of a white crystalline residue consisting of crude isonitroso acetone (94.9% purity). The yield of the pure product based on the added nitrosyl chloride was about 95.1%, and the yield based on the used acetone was about 96.0%. The crude product containing α-chloro isonitrosoacetone (3.6%) was crystallized from $CCl_4$ or ethyl ether/petroleum ether mixtures to give the pure product melting at 67–68° C.

*Example 3*

150 gr. of acetone were reacted over 1 hour at 18° C. with 12.5 gr. of NOCl and 40.3 gr. of a 32% ethanol solution of KOH. Afterwards, the salts were filtered and the filtrate was evaporated to dryness under reduced pressure at room temperature to give 16.6 gr. of crude isonitrosoacetone (90.2% purity). The yield was about 90.2% (when based on both the used acetone and the added nitrosyl chloride).

*Example 4*

150 gr. of acetone were reacted over 1 hour at about 20° C. with 13.2 gr. of liquid NOCl and 21.6 gr. of piperidine, this latter being added at such a rate that the reaction medium was kept at a pH below 7. After the salt was filtered, the reaction mixture was evaporated to dryness under reduced pressure at room temperature, to give 18 gr. of a brown residue consisting of isonitroso acetone (71.4%), which was crystallized from $CCl_4$ to the pure product. The yield based on the added NOCl was about 73.2%.

*Example 5*

A suspension of 10 gr. of $CaCO_3$ in 286 gr. of methyl ethyl ketone was reacted with 19.8 gr. of liquid NOCl at a temperature from 17° to 20° C. while stirring. The NOCl addition was completed in 3 hours, during this time two portions of 7.5 gr. of $CaCO_3$ being further added. The solids were filtered and washed with 95 gr. of methyl ethyl ketone. The two combined solutions were then evaporated to dryness under reduced pressure to give 29.5 gr. of white solid diacetylmonoxime (90.2% purity) which, after crystallization from $CCl_4$, melted at 73–74° C. The yield based on the added NOCl was about 87.2%.

*Example 6*

To a stirred suspension of 7.5 gr. of $CaCo_3$ in 150 gr. of methyl isobutyl ketone, 7.5 gr. of NOCl were added over one and a half hours, on keeping the temperatures at about 20° C. Before the reaction was completed, further 7 gr. of $CaCO_3$ were added. Afterwards, the solids were filtered and the filtrate was evaporated to dryness under reduced pressure to give 14.4 gr. of crude methyl-α-isonitroso-isobutyl-ketone, which, after two subsequent re-crystallizations, yield the pure product melting at 75–76° C.

*Example 7*

In this example the method of the present invention was carried out as a "continuous" process.

The reaction vessel was a 2,000 ml. 3-necked glass flask fitted with an overflow tube and a stirrer.

To a suspension of 147 gr. of $CaCO_3$ in 1710 ml. of acetone, gaseous nitrosyl chloride was added, on keeping the reaction temperature at +15° to +18° C. (by means of a water bath). At the end of 3½ hours, after 148 gr. of NOCl had been added, the suspension was continuously withdrawn at the following feed rates per hour: 411 gr. acetone, 27 gr. $CaCO_3$, 26.8 gr. NOCl. The suspension was filtered upon being withdrawn, and the solution was evaporated to dryness under reduced pressure at room temperature. At the end of 8 hours, 282 gr. of isonitrosoacetone were recovered (92.3% purity). The yield of the pure product based on the acetone used during the 8 reaction hours was about 92.2%; on the contrary, the yield based on the nitrosyl chloride, added at the same time to the reaction mixture, was about 91.1%.

We claim:
1. A process for preparing isonitrosoketones of the following general formula:

wherein R represents a member selected from the group consisting of a hydrogen atom and an alkyl group having up to 3 carbon atoms, which comprises reacting a ketone of the following general formula:

$$CH_3—CO—CH_2—R$$

wherein R has the meaning referred to above with nitrosyl chloride in the presence of calcium carbonate which reacts with hydrochloric acid as formed at a temperature in the range from −15° C. to +40°C.

2. A process according to claim 1 in which said ketone is acetone.

3. A process according to claim 1 in which said ketone is methyl ethyl ketone.

4. A process according to claim 1 in which said ketone is methyl isobutyl ketone.

5. A process according to claim 1 carried out continuously.

References Cited by the Examiner

UNITED STATES PATENTS 2,734,084  2/56  Doerner _____ 260—566
2,844,630  7/58  Johnson et al. _____ 260—566

OTHER REFERENCES

Lynn et al.: "C.A.," vol. 21, p. 3888 (1927).
Manning et al.: "J.A.C.S.," vol. 81, pp. 4885–4890 (1959).

CHARLES B. PARKER, *Primary Examiner.*